United States Patent [19]

Ikegami

[11] Patent Number: 5,138,271
[45] Date of Patent: Aug. 11, 1992

[54] METHOD FOR COOLING A CHARGED PARTICLE BEAM

[76] Inventor: Hidetsugu Ikegami, 12-50, Hibarigaoka 2-chome, Takarazuka-shi, Hyogo 665, Japan

[21] Appl. No.: 582,215
[22] PCT Filed: Feb. 23, 1990
[86] PCT No.: PCT/JP90/00218
 § 371 Date: Sep. 27, 1990
 § 102(e) Date: Sep. 27, 1990
[87] PCT Pub. No.: WO90/10368
 PCT Pub. Date: Sep. 7, 1990

[30] Foreign Application Priority Data

Feb. 23, 1989 [JP] Japan .................................. 1-41706

[51] Int. Cl.⁵ ................... H01J 23/10; H05H 13/04; H05H 7/00; G21B 1/00
[52] U.S. Cl. ............................ 328/233; 328/235; 313/11; 315/5.41; 165/104.33; 376/121
[58] Field of Search ................. 328/233, 235, 228; 313/11; 315/5.41; 165/104.33; 376/117, 121

[56] References Cited

U.S. PATENT DOCUMENTS

| 3,412,337 | 11/1968 | Lothrop ........................ 328/233 |
| 4,631,743 | 12/1986 | Tomimasu ..................... 328/233 |
| 4,780,683 | 10/1988 | Nakata ......................... 328/228 |
| 5,001,438 | 3/1991 | Miyata et al. .................. 328/228 |

FOREIGN PATENT DOCUMENTS 22400 1/1987 Japan .
147642 7/1987 Japan .
287600 12/1987 Japan .

Primary Examiner—Donald J. Yusko
Assistant Examiner—Brian Zimmerman
Attorney, Agent, or Firm—Burns, Doane, Swecker & Mathis

[57] ABSTRACT

In a method for cooling a charged particle beam that is available in a charged particle beam apparatus such as a ring-shaped accelerator or a storage ring of charged particles, a magnetic field is generated in the traveling direction of a charged particle beam by means of a solenoid magnet (5) disposed along the charged particle beam to cause the charged particles to perform cyclotron gyration motion, and also a high-frequency field is sent from a high-frequency resonator (4) for stimulating cyclotron maser antiparallel or parallel to the charged particle beam. Thereby, a non-uniform part of kinetic energy of the charged particle beam within a plane normal to the beam is radiated in the form of cyclotron maser, and improvement in an emittance of the charged particle beam and unification of the total energy are contemplated.

4 Claims, 1 Drawing Sheet

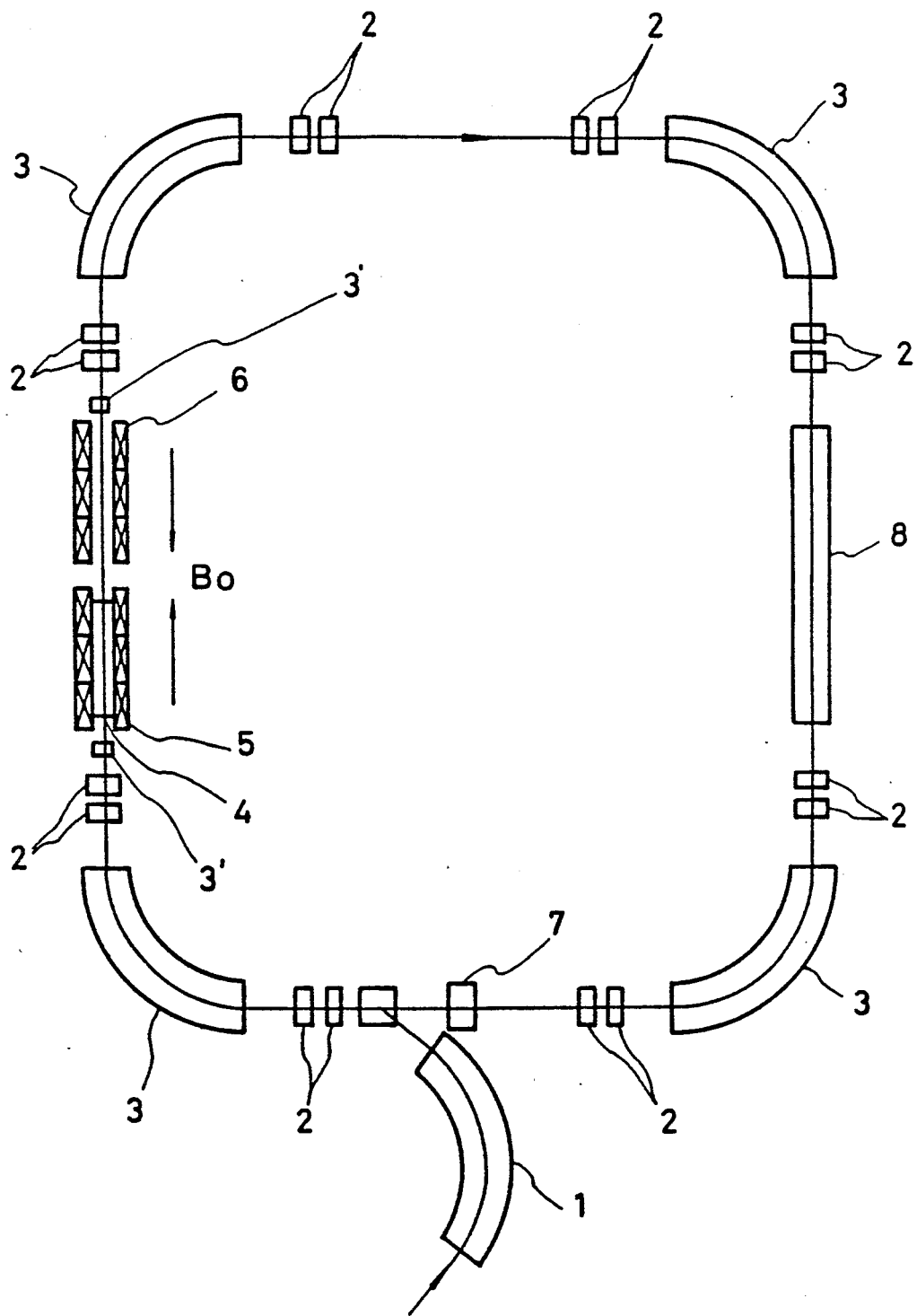

METHOD FOR COOLING A CHARGED PARTICLE BEAM

TECHNICAL FIELD

The present invention relates to a method for cooling a charged particle beam that is available in an electron beam apparatus, such as a synchrotron radiation ring, an electron storage ring, an electron accelerator, etc., and an ion beam apparatus, such as an ion accelerator, an ion storage ring, an ion beam cooler ring, etc., or in an electron-electron, electron-ion or ion-ion collider.

BACKGROUND TECHNIQUE

Generally, an electron beam apparatus of a ring type is represented by an electron synchrotron, an electron storage ring or an electron collider. In such an electron beam apparatus, there is an effect that by synchrotron radiation (abbreviated to SR), thermal motion within a plane normal to the direction of the beam is increased simultaneously with occurrence of reduction and unification of energy in the traveling direction of the beam. When the increase of thermal motion within the normal plane is more strictly defined in terms of another expression, this mans that an emittance increases which is defined as a product of an inclination angle of an electron beam with respect to an axial direction by an extension of the electron beam within a plane normal to the axial direction. With the increase of an emittance, a deviation amplitude of an electron beam in the ring from a reference orbit would become large and eventually electrons dropping out from a stable orbit would be produced. Such electrons bombard an inner wall surface of a vacuum chamber forming the ring and kick out an adsorbed gas and a part of the inner wall constituent material from the inner wall, and these would enter into the electron beam, resulting in deterioration of the beam. A basic cause of the limit of the beam storage time within the electron beam storage ring resides in deterioration of beam quality caused by increase of an emittance of the electron beam accompanying the SR.

Therefore, if an emittance of such an electron beam is reduced to an extremely small value, improvement in a storage time of an electron beam in a storage ring and high luminescence version of an SR or high qualification of a beam issued from an electron accelerator can be realized.

On the other hand, in an apparatus of charged particles other than electrons, that is, an ion beam, while SR is not generated, an emittance of an ion beam derived from an ion source is usually large as compared to the case of electrons, and consequently, requirement for improvements in an emittance is intense similarly to an electron beam apparatus.

Among charged particle beams, in order to realize high quality version of an electron beam, it is required to make an emittance of an electron beam extremely small simultaneously with realization of uniform distribution of energy by cooling an electron beam, but a method for improving an emittance has not been invented so far.

On the other hand, for the purpose of unification of beam energy of charged particles other than electrons, that is, ions and improvement of an emittance, a method relying upon compensative acceleration control called "stochastic cooling method" has been put in practical use. However, this method necessitates a long time for cooling of an ion beam, and is therefore available neither for a rapid-cycling accelerator nor for a charged particle storage ring equipped with an internal target. For instance, in order to unify energy of a proton beam up to one in thousands, several minutes are necessary, and it is difficult to put this method in practical use.

An object of the present invention is to provide a charged particle beam cooling method, which resolves all these problems and which momentarily cools every charged particle beam regardless of a pulsed beam or a continuous beam.

DISCLOSURE OF THE INVENTION

In order to achieve the afore-mentioned object, according to the present invention, in a ring type charged particle accelerator, a charged particle beam storage ring, a charged particle beam cooler ring, or a charged particle collider, as a measure for reducing an emittance of a charged particle beam and also realizing unification of total energy of a charged particle beam, in order that after a part of energy along the beam axis has been converted into cyclotron gyration motion, a non-uniform part of kinetic energy within a normal plane of the charged particle beam may be forcibly radiated as a charged particle cyclotron maser, a solenoid magnetic field generating section and a high-frequency resonator for stimulating a cyclotron maser are disposed along the charged particle beam. The invention is characterized in that in this solenoid magnetic field generating section, a high-frequency field for stimulating a maser is sent in the aforementioned high-frequency resonator either antiparallel or parallel to the charged particle beam, and also in order to cause the charged particles to perform coherent cyclotron gyration motions for the purpose of greatly enhancing a stimulation efficiency, a solenoid magnetic field for compensating phase angles of the cyclotron gyration motions is generated separately along the beam.

In more particular, the present invention is constituted of the following means which are common to all the charged particles including both electrons and ions. That is, a solenoid magnetic field generating section disposed within a charged particle apparatus generates a solenoid magnetic field $B_0$ (tesla) along the charged particle beam axis, and thereby causes the charged particles to perform cyclotron gyration motion within a plane normal to the beam axis at an angular frequency of $\omega_c^*/\gamma_\perp = eB_0/m_0\gamma_\perp$, where $e$ and $m_0$ respectively represent the electric charge and the rest mass of the charged particle, and $\gamma_\perp$ represents a relativistic energy factor of the gyration motion within the normal plane. It is assumed that all the physical quantities used in the following description are given by the mksa units.

Now a charged particle beam is made to be incident at a minute angle $\theta$ with respect to the axial direction of the magnetic field, and non-uniform energy within a plane normal to a beam of charged particles is forcibly radiated by making use of that generation principle of a charged-particle cyclotron maser according to the present invention which is obtained by generalizing the principle of the electron cyclotron maser. The above-mentioned procedure results in improvements of an emittance and unification of energy.

In order to make a charged particle cyclotron maser oscillate, a high frequency wave for stimulation is generated by a high-frequency resonator equipped in the solenoid magnetic field. A standing wave may be practically used as such a high frequency. An angular frequency $\omega$ of the high frequency wave for stimulation and its width $\Delta\omega$ are necessitated to fulfil the following Cyclotron Maser Cooling (abbreviated to CMC) condition:

$$\omega = \frac{\omega_c^*}{(1 - \epsilon\beta_{\|})\gamma_{\perp,min}\gamma_{\|,min}}$$

$$\frac{\Delta\omega}{\omega} \simeq 2.5 \frac{(\theta + D')}{\gamma_{\perp}^2}\left(\theta\gamma_{\|}\Delta\gamma_{\|} + \frac{T_{\perp}^*}{m_0c^2}\right)$$

Here, when resonance is caused to occur by the use of a traveling component of the high frequency wave which is parallel to the charged particle beam, $\epsilon=1$ is substituted, but when use is made about a traveling component antiparallel to the beam, $\epsilon=-1$ is substituted, and $\gamma_{\|}$ is a relativistic energy factor of motion in the direction of the magnetic field axis of the charged particle and is represented by:

$$\gamma_{\|} = [1-\beta_{\|}^2]^{-\frac{1}{2}}$$

On the other hand, $\gamma_{\perp}$ and $\gamma$ are related by the following equation:

$$\gamma_{\perp}^2 = 1+\beta_{\|}^2\gamma_{\|}^2\theta^2+(2T_{\perp}^*/m_0c^2)$$

Here, $\beta_{\|} \equiv v_{\|}/c$, where $v_{81}$ represents a velocity of a charged particle along the magnetic field axis, $T_{\|}^*$ represents thermal kinetic energy within a plane normal to the beam, and c represents the light velocity. $\gamma_{\perp,min}$ and $\gamma_{\|,min}$ respectively represent minimum values of $\gamma_{\|}$ and $\gamma_{\perp}$. $\Delta\gamma$ represents a width of $\gamma_{\|}$ produced by non-uniformity of particle energy, and $D'$ represents the derivative of momentum dispersion at an entrance of the cyclotron maser cooling section.

The decay time $\tau_{\perp}$ of beam emittance due to the cyclotron maser cooling under these two conditions, is represented by:

$$\tau_{\perp} \simeq \frac{ceB_0}{2r_pI(\omega)} \cdot \left(\frac{\Delta\omega}{\omega}\right)^3 \times \frac{1}{(1-\epsilon\beta_{\|})(\gamma_{\perp}-1)}$$

and the cooling time $\tau_{\|}$ for unifying beam energy is given by:

$$\tau_{\|} = \frac{1-\epsilon\beta_{\|}}{(\theta+D')\theta} \cdot \gamma_{\perp} \cdot \tau_{\perp}$$

Here, $r_p$ represents a classical radius of the charged particle, and $I(\omega)$ represents a magnitude of a pointing vector, that is, an energy flow density of a stimulating high-frequency field.

The possibility of realization of improvements in an emittance and uniformity of energy by means of the above-described apparatus is, however, limited to a charged particle beam having extremely low energy. In order to eliminate this shortcoming, a corrective solenoid magnetic field that is opposite in direction and equal in magnitude to the solenoid magnetic field in the cyclotron maser cooling (CMC) section is introduced into the beam ring. In addition, a maser stimulating high-frequency field is synchronized with an accelerating frequency of the charged particle so that the charged particle may maintain coherency, that is, interfering property of cyclotron gyration motion during the circulation during which the charged particle is circulating in the storage ring. Thereby, the cyclotron gyration motion of the charged particle beam would be always correctly carried out without disturbance of phase between the motion and the maser stimulating high frequency wave, and the particle beam would be preferably cooled in a repetitive fashion in the CMC section during circulation through the storage ring.

Here, three examples of application in the cases of electrons of energies $E_e=200$ MeV (mega-electron-volts), i.e., $\gamma_{\|}=400$ and $E_e=1$ GeV (giga-electron-volts), i.e., $\gamma_{\|}=2000$ and proton of energy $E_p=1.7$ GeV, i.e., $\gamma_{\|}=2.8$ will be shown together in Table 1.

TABLE 1

Examples of the cyclotron maser cooling are applied to two electron storage rings and a proton ring:

| $\frac{\Delta\gamma_{\|}{}^a}{\gamma_{\|}-1}$ | D' (rad) | $\frac{\Delta\omega^b}{\omega}$ | $I(\omega)$ (kW·m$^{-2}$) | |
|---|---|---|---|---|
| Ee = 200 MeV | $10^{-3}$ | −0.009 | $3\times10^{-4}$ | 30 |
| Ee = 1.0 GeV | $10^{-3}$ | −0.009 | $3\times10^{-4}$ | 30 |
| Ep = 1.7 GeV | $10^{-2}$ | 0 | $2\times10^{-5}$ | 3000 |

| | $\tau_{\perp}{}^{eff}$ | $\tau_{(ms)}{}^{eff}$ |
|---|---|---|
| Ee = 200 MeV | $t_0{}^c$ | 0.09 |
| Ee = 1.0 GeV | $t_0{}^c$ | 0.07 |
| Ep = 1.7 GeV | $t_0{}^c$ | 0.1 |

$^a$assumed value of a kinetic energy resolution of a particle beam before CMC
$^b$frequency width of a stimulating high-frequency field determined by a CMC condition (an inverse of Q-value of a high frequency resonator). In this example, adjustment is made such that $D' = 0.9\theta$ for an electron ring and $D' = 0$ for a proton ring.
$^c$improvement in an emittance by cooling of once passage through a CMC section.

In every case, it is assumed that $\theta=0.01$, a magnetic flux density $B_0=6$ tesla in the cooling section, and an electromaganetic power density $I(\omega)$ of the high frequency wave is equal to 30 kW·m$^{-2}$ for an electron beam and to 3000 kW·m$^{-2}$ for a proton beam. The high-frequency wave is a standing wave, and the frequency is preset so that a field component traveling parallel to the beam may fulfil a CMC-cooling condition. While the effective cooling times $\tau_{\perp}{}^{eff}$ and $\tau_{\|}{}^{eff}$ in the rings are respectively given by:

$$\tau_{\perp}{}^{eff}=\eta^{-1}\tau_{\perp},\ \tau_{\|}{}^{eff}=\eta^{-1}\tau_{\|},$$

$\eta$ represents an occupation ratio of a cooling section with respect to a total circumferential length of a particle storage ring, and here $\eta=0.07$ is assumed for every one of the three examples of application.

As will be obvious from Table-1, in every one of the three examples, the emittance decay time $\tau_{\perp}$ is shorter than a transit time through the cooling section, and the effective cooling time $\tau_{\perp}{}^{eff}$ is shorter than a ring circulation period $t_0$ of a particle. Also, the effective cooling time $\tau_{\|}{}^{eff}$ of unification of kinetic energy is shorter than 1 millisecond in every case, and this is faster by a number of orders as compared to every cooling method known in the prior art.

The above-mentioned concerns the case where a component of a high-frequency field traveling antiparallel to the beam is resonant with a fundamental frequency of the CMC condition, even if it is resonant with an integral multiple of the frequency or even if resonance is achieved with respect to a field component traveling parallel to the beam, the CMC effect is present. The choice of whether or not a fundamental frequency is chosen, or the choice of an antiparallel traveling field component or a parallel traveling field component with respect to a beam, could be done depending upon easiness in the manufacturing technique of a solenoid magnetic field and a high-frequency resonator.

BRIEF DESCRIPTION OF THE DRAWINGS

The FIGURE is a conceptual view showing one example of an SR ring that is used in a method for cooling a charged particle beam according to one preferred embodiment of the present invention.

THE BEST MODE FOR PRACTICING THE INVENTION

In the following, description will be made on one preferred embodiment of the method for cooling a charged particle beam according to the present invention with reference to the drawing.

The drawing is a general layout view of an SR ring when the method according to the present invention was practised in the same apparatus. The illustrated SR ring is composed of the respective elements including a charged particle beam injection system 1, beam converging magnets 2, beam deflecting magnets 3, small-sized beam deflecting magnets 3', a high-frequency resonator 4 for stimulating particle cyclotron maser cooling (CMC), a solenoid magnet 5, a corrective solenoid magnet 6, an accelerating high-frequency resonator 7, and an SR generating section 8.

When a particle beam is injected from the charged particle beam injection system 1 to the SR ring having such a construction, after the particle beam passed through the converging magnets 2 (generally quadruple magnets are used) it is deflected by the deflecting magnets, and further an inclination angle $\theta$ of the beam is adjusted by the small-sized deflecting magnets 3', and it is led to the CMC stimulating high-frequency resonator 4.

In the CMC stimulating high-frequency resonator 4, the beam is highly qualified by attempting improvements in an emittance of the particle beam and unification of the beam energy. Speaking in more detail, in the CMC stimulating high-frequency resonator 4, a magnetic field $B_0$ is generated along the particle beam by the solenoid magnet, and the charged particles are traveling while performing cyclotron gyration motion within a plane normal to the beam. And by projecting a high-frequency wave within the high-frequency resonator 4 for stimulating CMC maser in the opposite direction to or in the same direction as the traveling direction of the charged particle beam, charged-particle cyclotron maser is generated, and an emittance of the charged particle beam is remarkably improved. In addition, simultaneously with this, cooling of the beam energy in the axial direction, that is, unification of energy is also achieved.

The charged particle beam emanating from the CMC stimulating high-frequency resonator 4 has its phase angle of cyclotron gyration equalized to that before entering the CMC stimulating high-frequency resonator 4 by the magnetic field in the axial direction of the corrective solenoid magnet 6, then the convergency and the momentum dispersion or its derivative is again adjusted by the converging magnets 2, beam deflecting magnets 3 and small-sized beam deflecting magnets 3', and SR having extra-high luminescence and excellent monochromaticity can be generated in the SR generating section 8. The charged particle beam further passes through the beam converting magnets 2 and the beam deflecting magnets 3, is supplementarily accelerated by the accelerating high-frequency resonator 7, and again led to the CMC stimulating high-frequency resonator 4, where high-qualification of the beam is achieved by forced radiation cooling by means of cyclotron maser.

In the above, the beam cooling method according to the present invention has been described with respect to the case where the method was applied to an SR ring, but when it is applied to a storage ring of charged particles other than electrons and an accelerator, the SR generating section 8 is unnecessary, and instead it is possible to equip with other types of experimental apparatuses. In addition, as the $\omega_c^*$ in the above description, a stimulating high-frequency field at a high frequency $\omega_c^*$ corresponding to a value of an integral multiple of the $\omega_c^*$ could be employed without any inconvenience.

As described above, according to the present invention, a remarkable effect is achieved in that by disposing a solenoid magnetic field generating section along a charged particle beam and sending a cyclotron maser stimulating high-frequency field traveling antiparallel or parallel to the charged particle beam in the above-mentioned solenoid magnetic field generating section, it is possible to extremely highly qualify an emittance and an energy resolution of the charged particle beam, a charged particle beam that is extremely excellent in monochromaticity and brightness, can be obtained, and further that by applying an axial direction magnetic field generated by a corrective solenoid magnet 6 to the charged particle beam emanating from the CMC stimulating high-frequency resonator 4, a phase angle of cyclotron gyration is equalized to that before entering the CMC stimulating high-frequency resonator 4, and again high qualification of the beam can be achieved by the radiation cooling in a repetitive fashion of cyclotron maser within the CMC stimulating high-frequency resonator 4.

INDUSTRIAL AVAILABILITY

While the above-described preferred embodiment has been explained with respect to only an SR ring, the present invention is equally applicable to an electron beam storage ring, an electron accelerator, an ion accelerator, an ion beam cooler ring and various types of particle colliders.

I claim:

1. A method of cooling a charged particle beam in a charged particle beam apparatus, said method comprising the steps of:
   moving, along a beam path, said charged particle beam having a beam axis;
   generating a solenoid magnetic field along said beam axis using a solenoid located along a part of said beam path;
   projecting a high-frequency field in a selected direction parallel or antiparallel to said charged particle beam by disposing a high-frequency resonator within said solenoid magnetic field for stimulating a cyclotron maser such that kinetic energy of said charged particle beam is unified within a plane normal to said beam axis for radiation from said cyclotron maser.

2. A method as recited in claim 1, further comprising the step of:
   adjusting an angle of said charged particle beam before said solenoid magnetic field generating step using a deflecting magnet to cause cyclotron gyration motion for said charged particle beam.

3. A method as recited in claim 2, further comprising the step of:

applying a solenoid magnetic field to said charged particle beam after the charged particle beam is passed through said high-frequency resonator to control a phase of said cyclotron gyration motion with respect to a phase of a high frequency of the high-frequency field thereby enhancing stimulation efficiency of the cyclotron maser.

4. A charged particle beam apparatus for use in moving, along a beam path, a charged particle beam having a beam axis, said apparatus comprising:

beam path means for defining said beam path;

magnetic field generating means, located at a part of said beam path, for generating a solenoid magnetic field along said beam axis; and a high frequency resonator, disposed within said magnetic field generating means, for producing a high frequency wave in a selected direction parallel or antiparallel to said charged particle beam to cause cyclotron gyration motion for said charged particle beam thereby causing said charged particle beam to form a cyclotron maser.

* * * * *